(12) United States Patent
Riddle

(10) Patent No.: US 7,385,924 B1
(45) Date of Patent: Jun. 10, 2008

(54) ENHANCED FLOW DATA RECORDS INCLUDING TRAFFIC TYPE DATA

(75) Inventor: Guy Riddle, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 952 days.

(21) Appl. No.: 10/676,383

(22) Filed: Sep. 30, 2003

(51) Int. Cl.
*G01R 31/08* (2006.01)

(52) U.S. Cl. .................. 370/235; 370/252; 370/389

(58) Field of Classification Search ............ 370/395.3, 370/395.31, 395.5, 230, 428, 429, 419, 235, 370/359, 381, 389, 392, 252–255, 395.34, 370/395.52; 711/203–209, 211; 709/238–244, 709/223, 224; 726/12, 13; 713/152
See application file for complete search history.

(56) References Cited

U.S. PATENT DOCUMENTS

| | | | |
|---|---|---|---|
| 4,914,650 A | | 4/1990 | Sriram |
| 5,828,846 A | * | 10/1998 | Kirby et al. ................. 709/238 |
| 6,003,077 A | | 12/1999 | Bawden et al. |
| 6,023,456 A | | 2/2000 | Chapman et al. |
| 6,046,980 A | | 4/2000 | Packer |
| 6,219,050 B1 | | 4/2001 | Schaffer |
| 6,285,660 B1 | | 9/2001 | Ronen |
| 6,397,359 B1 | | 5/2002 | Chandra et al. |
| 6,584,467 B1 | | 6/2003 | Haught et al. |
| 6,681,232 B1 | | 1/2004 | Sistanizadeh et al. |
| 6,701,359 B1 | | 3/2004 | Calabrez et al. |
| 6,738,352 B1 | * | 5/2004 | Yamada et al. ............. 370/238 |
| 6,798,763 B1 | | 9/2004 | Kimura et al. |
| 6,894,972 B1 | * | 5/2005 | Phaal .......................... 370/229 |
| 7,120,931 B1 | * | 10/2006 | Cheriton ...................... 726/13 |
| 7,193,968 B1 | * | 3/2007 | Kapoor et al. .............. 370/235 |
| 2002/0122427 A1 | | 9/2002 | Kamenisky et al. |
| 2002/0143901 A1 | | 10/2002 | Lupo et al. |
| 2003/0035365 A1 | | 2/2003 | Walsh et al. |
| 2003/0112764 A1 | | 6/2003 | Gaspard et al. |

* cited by examiner

*Primary Examiner*—Doris H. To
*Assistant Examiner*—Ian N. Moore
(74) *Attorney, Agent, or Firm*—Mark J. Spolyar

(57) ABSTRACT

Methods, apparatuses and systems directed to a flow-based, traffic-classification-aware data collection and reporting system that combine flow-based data collection technologies with enhanced traffic classification functionality to allow for analysis and reporting into aspects of network operations that prior art systems cannot provide. Embodiments provide enhanced views into the operation of computer network infrastructures to facilitate monitoring, administration, compliance and other tasks associated with networks. When a traffic flow terminates, a traffic monitoring device emits a flow data record (FDR) containing measurements variables and other attributes for an individual flow. A data collector gathers the flow data records and enters them into a database. A network management application can then query the database with selected commands to derive reports characterizing operation of the network suitable to diagnose problems or view conditions associated with the network.

26 Claims, 7 Drawing Sheets

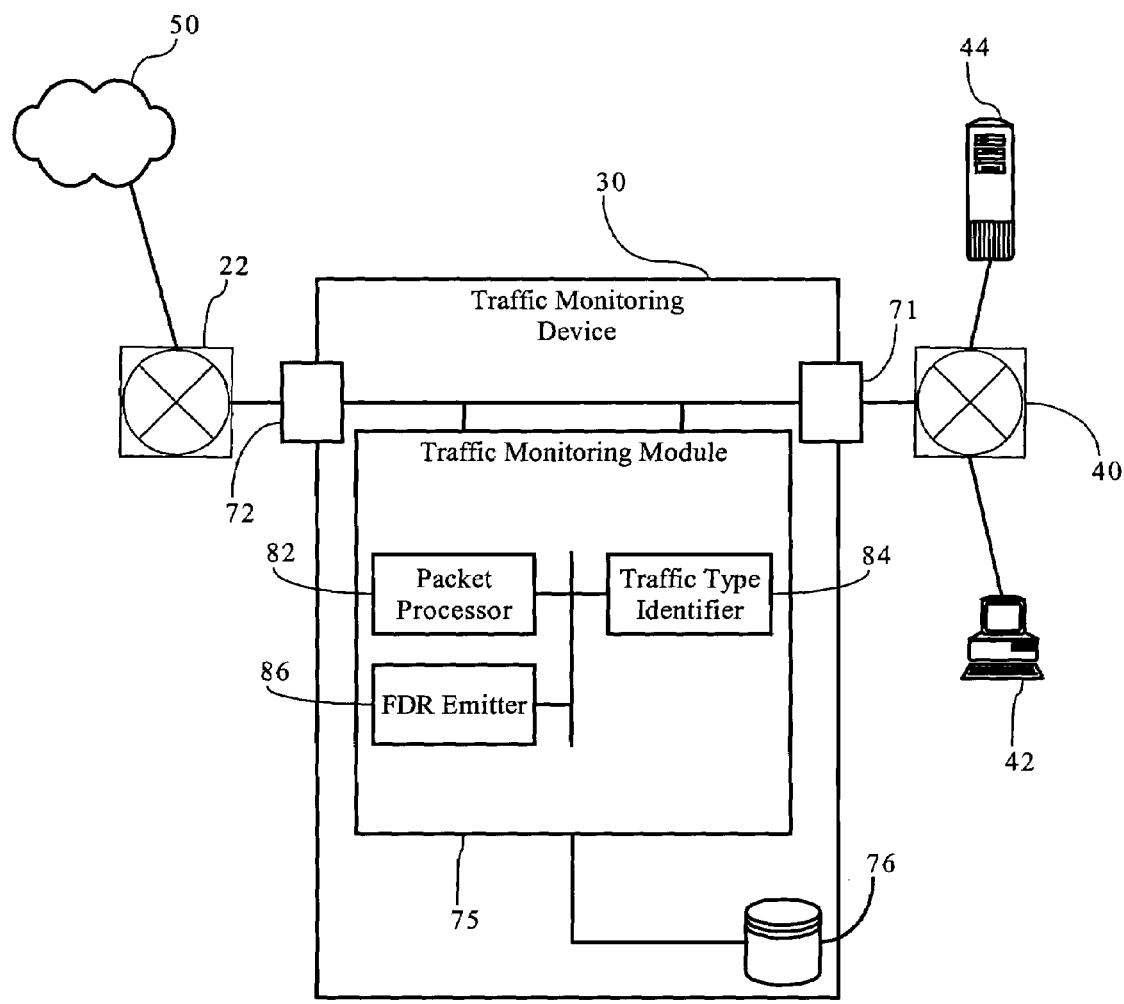
Fig._1A

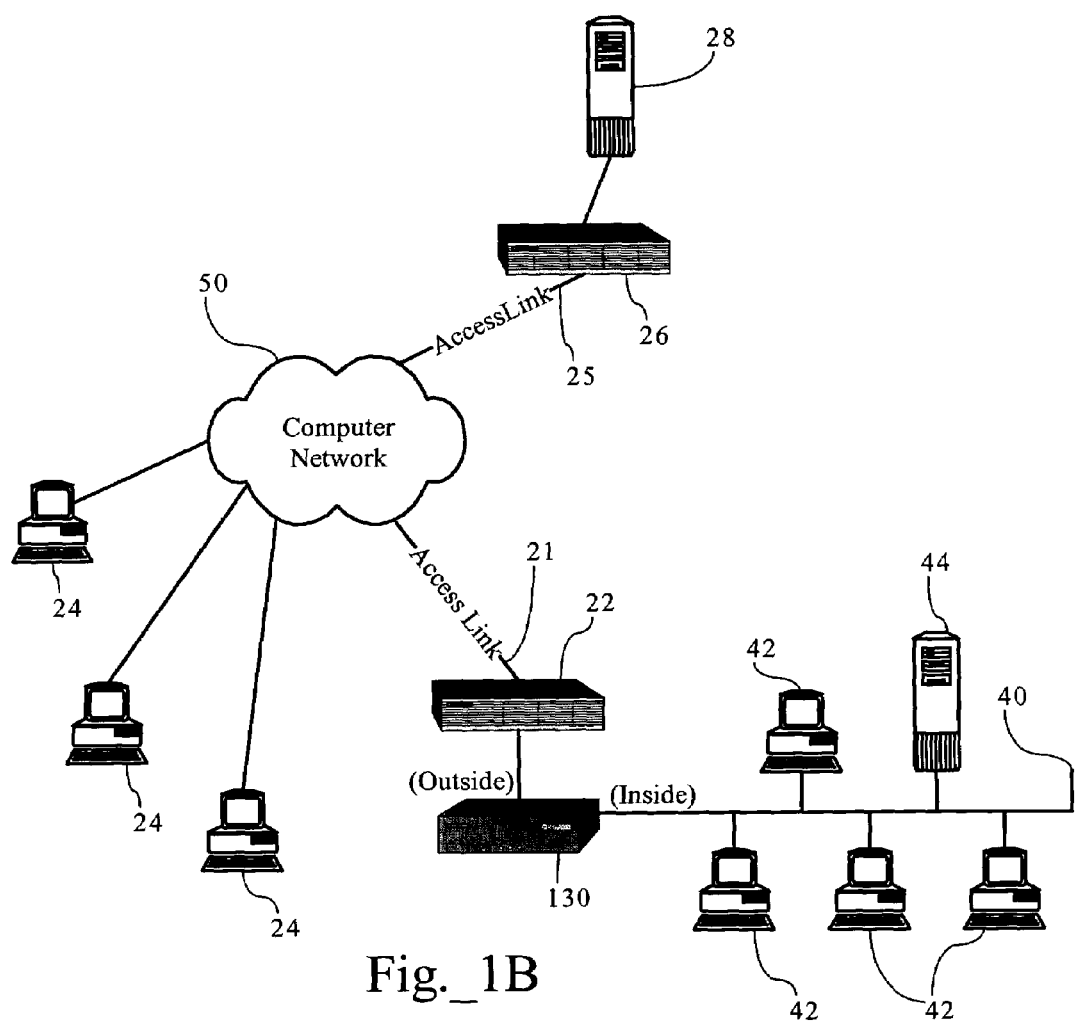
Fig._1B

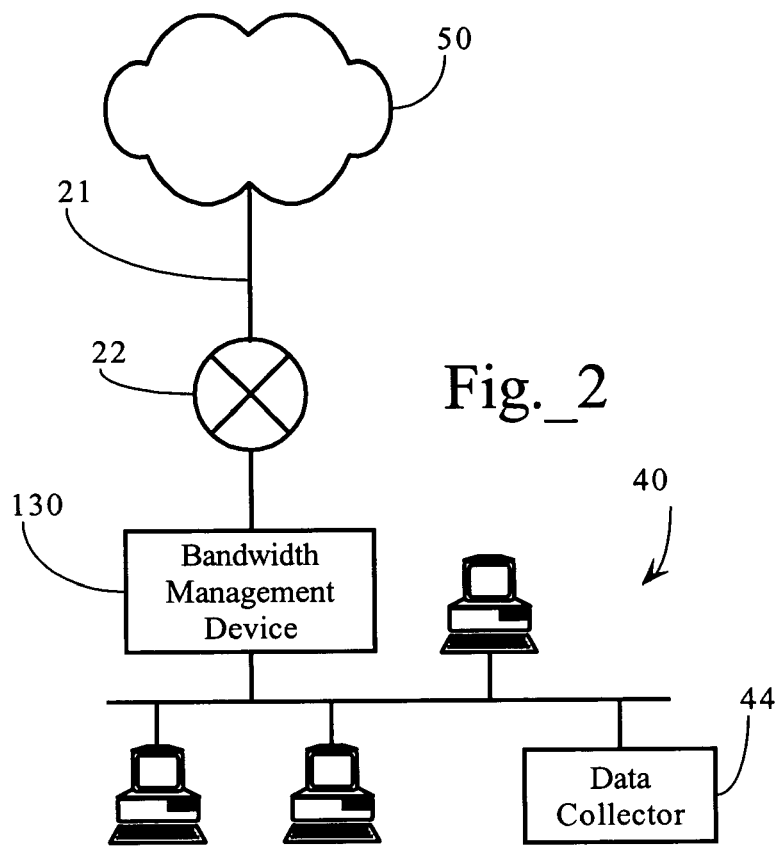
Fig._2
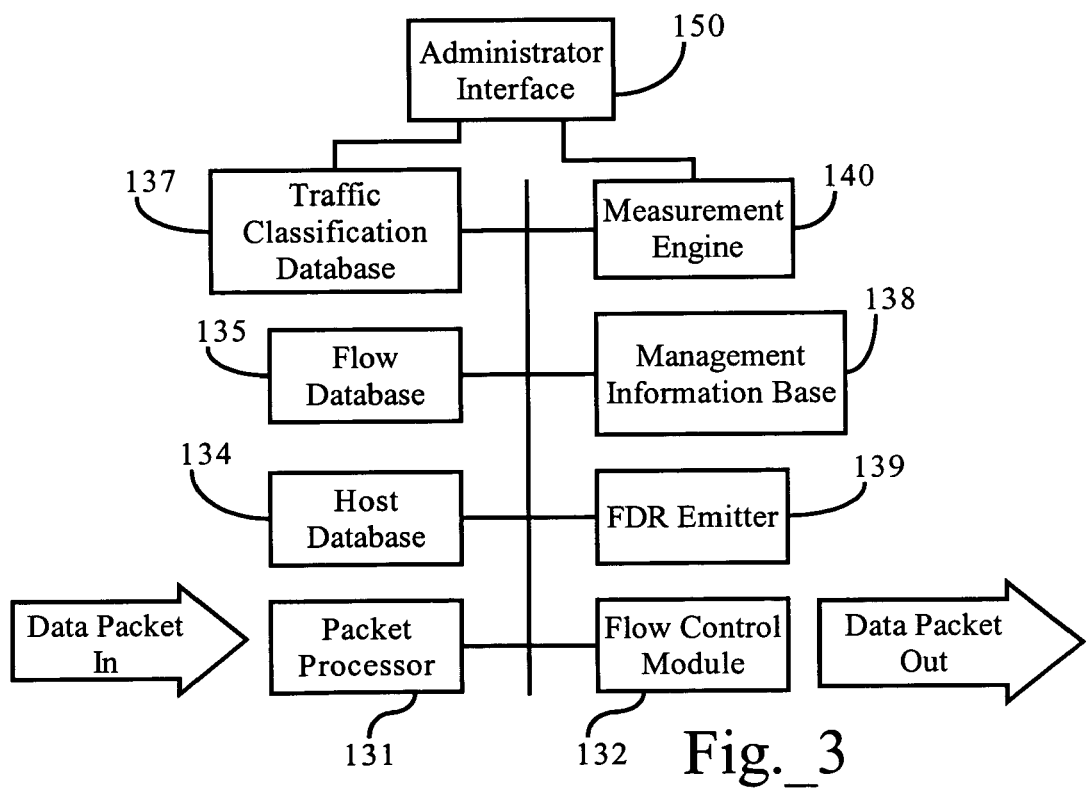
Fig._3

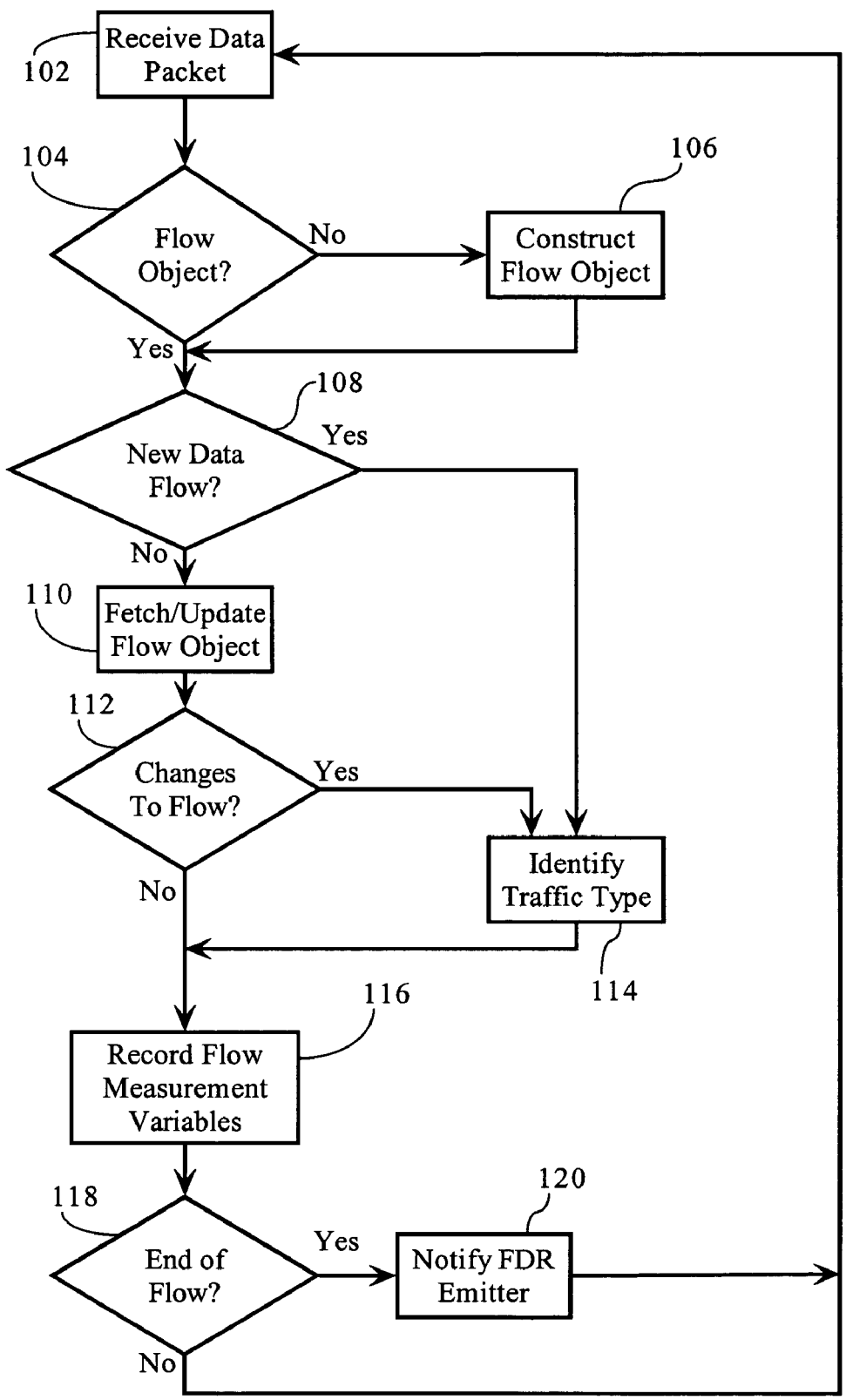
Fig._4

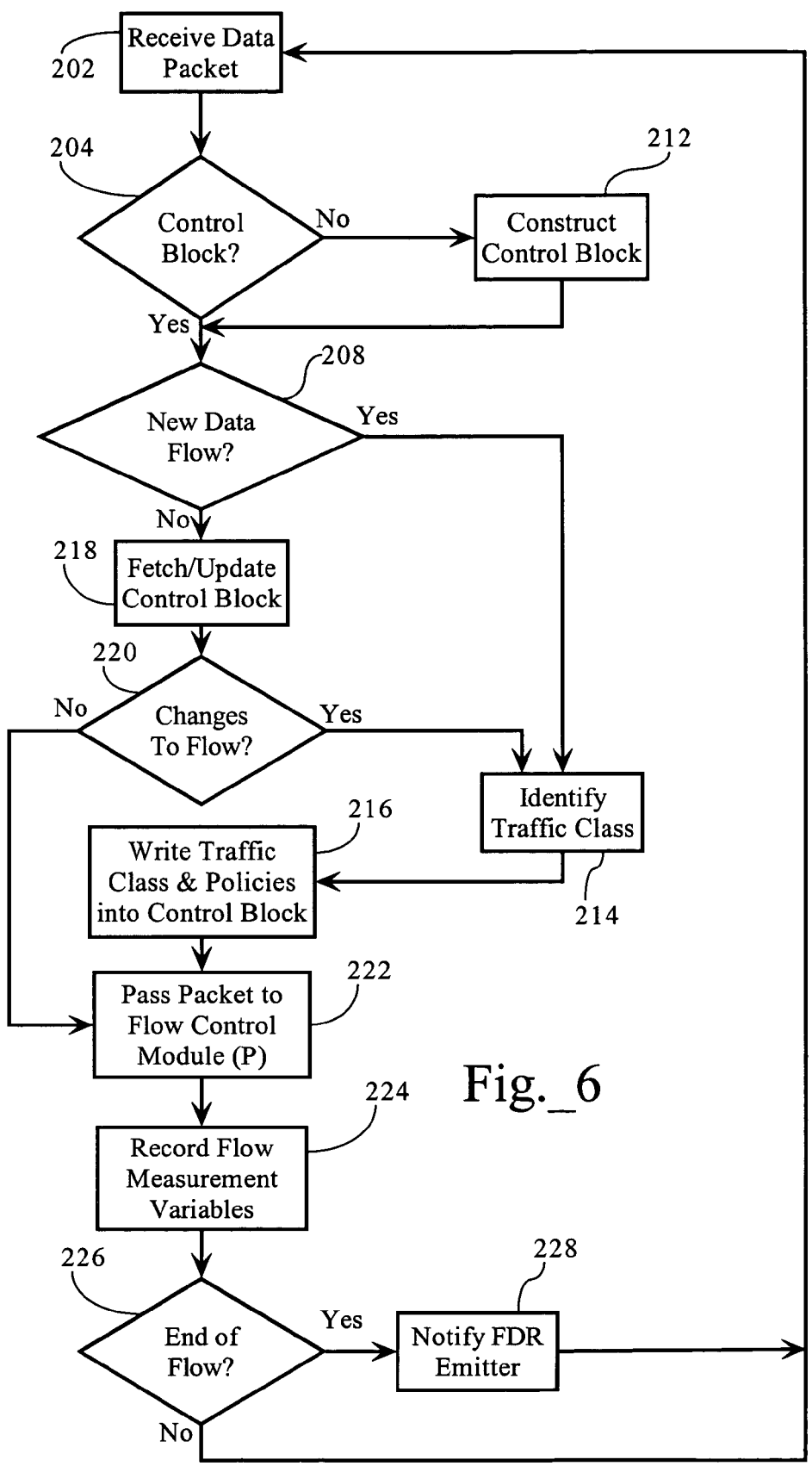
Fig._6

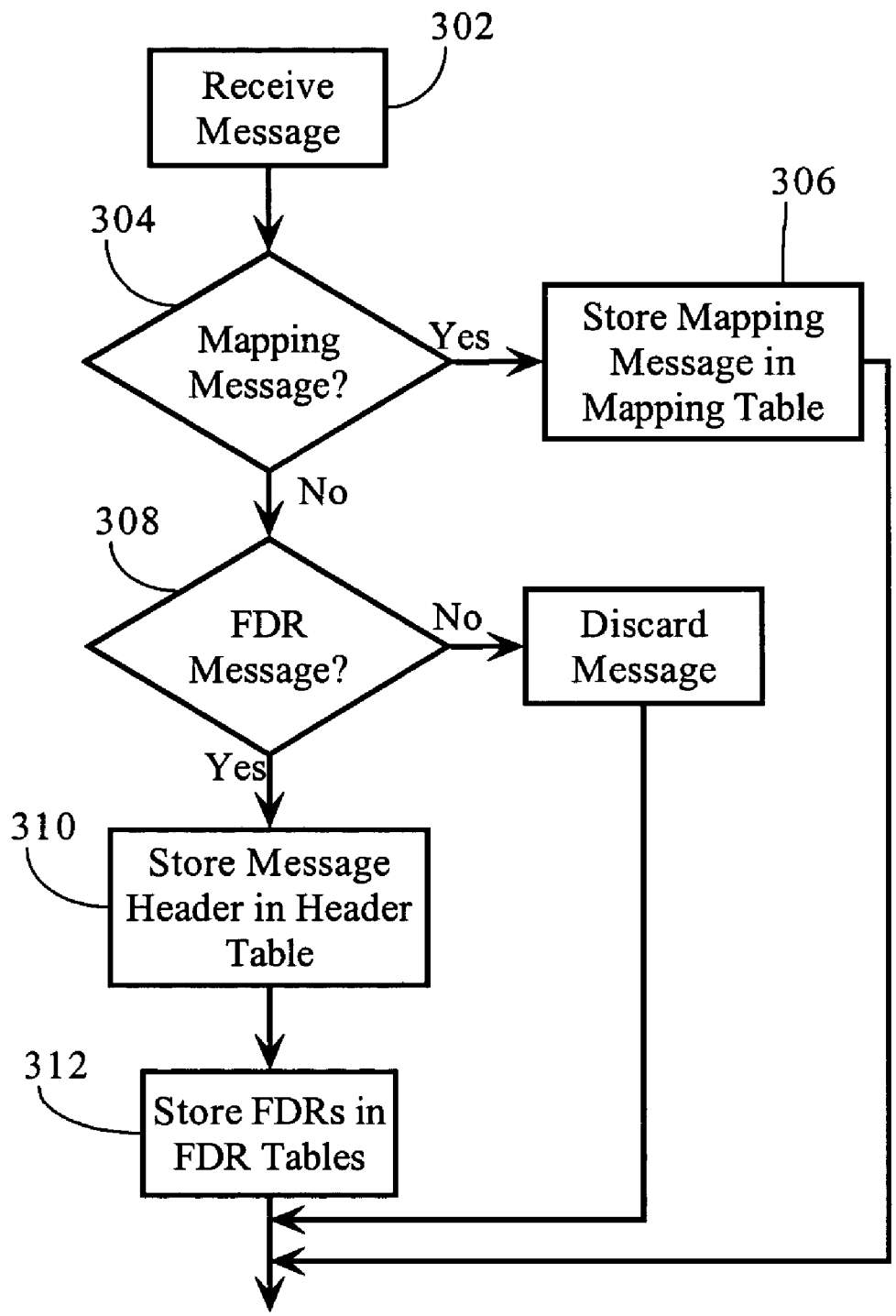
Fig._7

ENHANCED FLOW DATA RECORDS INCLUDING TRAFFIC TYPE DATA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS AND PATENTS

This application makes reference to the following commonly owned U.S. patent applications and patents, which are incorporated herein by reference in their entirety for alt purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, now abandoned, in the name of Guy Riddle, entitled "Method for Automatically Determining a Traffic Policy in a Packet Communications Network;"

U.S. patent application Ser. No. 09/206,772, now U.S. Pat. No. 6,456,630, in the name of Robert L. Packer, Brett D. Galloway and Ted Thi, entitled "Method for Data Rate Control for Heterogeneous or Peer Internetworking;"

U.S. patent application Ser. No. 10/039,992, now U.S. Pat. No. 7,032,072, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, currently pending, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, currently pending, in the name of Brett Galloway and George Powers, entitled "Classification Data Structure enabling Multi-Dimensional Network Traffic Classification and Control Schemes;"

U.S. patent application Ser. No. 10/453,345, currently pending, in the name of Scott Hankins, Michael R. Morford, and Michael J. Quinn, entitled "Flow-Based Packet Capture;" and U.S. patent application Ser. No. 10/611,573, currently pending, in the name of Roopesh Varier, David Jacobson, and Guy Riddle, entitled "Network Traffic Synchronization Mechanism."

FIELD OF THE INVENTION

The present invention relates to computer networks and, more particularly, to methods, apparatuses and systems directed to data collection schemes that allow for enhanced informational queries relating to the operation of computer network environments.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. patents and patent applications provide explanations of certain technical aspects of a packet based telecommunications network environment, such as Internet/Intranet technology based largely on the TCP/IP protocol suite, and describe the deployment of bandwidth management solutions to monitor and/or manage network environments using such protocols and technologies.

The management of such networks requires regular monitoring and collection of data characterizing various attributes of the network, its operation and/or the traffic flowing through it. For example, Cisco Systems, Inc. of San Jose, Calif. offers a feature set of data monitoring and collection technologies in connection with its routers, called Netflow®. The Cisco IOS® NetFlow feature set allows for the tracking of individual IP flows as they are received at a router or switching device. According to the technology, after a flow has terminated, a suitably configured router or switch generates a NetFlow record characterizing various attributes of the flow. The NetFlow record is ultimately transmitted as a datagram to a NetFlow Data Collector that stores and, optionally, filters the record. A NetFlow Record includes a variety of attributes, such as source and destination IP addresses, packet count, byte count, start and end time stamps, source and destination TCP/UDP ports, Quality of Service attributes, and routing-related information (e.g., nexthop and Autonomous System (AS) data). Such NetFlow® records are similar to call records, which are generated after the termination of telephone calls and used by the telephone industry as the basis of billing for long distance calls, for example.

Most network devices maintain data characterizing utilization, operation and/or performance of the network devices, and/or the network on which the devices operate, in limited, volatile memory, rather than using persistent storage (e.g., hard disks or other non-volatile memory). Consequently, network management applications commonly use the Simple Network Management Protocol (SNMP) to poll network devices (using the Management Information Base (MIB) associated with the network device) at regular time intervals and maintain the sampled raw data in a persistent data store. The network management application, such as a reporting package, then processes the raw data to allow for the creation of reports derived from the raw data detailing operation and/or performance of the device and/or the network. Management Information Bases typically contain low-level information characterizing the operation of the network device, such as the number of bytes or packets encountered on an interface, and do not provide information concerning the characteristics of data flows.

Using a reporting package, a network administrator may then analyze the data to yield information about the performance or utilization of the network and/or network devices associated with the network. Indeed, Various applications can then access the Data Collector to analyze the data for a variety of purposes, including accounting, billing, network planning, traffic engineering, and user or application monitoring. There are public-domain implementations of collectors for standard NetFlow records. These are, however, unable to answer questions such as "which hosts are running the busiest Kazaa (or other peer-to-peer file sharing) servers" (as NetFlow records are not suitable for analyzing and classifying network traffic that does not use registered IP port numbers).

Packeteer, Inc. of Cupertino, Calif. develops bandwidth monitoring, management, and reporting software and systems. Its PacketSeeker® systems and PacketShaper® bandwidth management devices, among other things, provide "application aware" monitoring of network traffic enabling classification of network traffic flows on a per application basis. The Packetshaper® bandwidth management device includes functionality allowing for classification of network traffic based on information from layers 2 to 7 of the OSI reference model. As discussed in the above-identified patents and patent applications, the bandwidth management device includes a measurement engine operative to record or maintain numeric totals of a particular measurement variable at periodic intervals on a traffic classification basis. The bandwidth management device further includes a management information base including standard network objects maintaining counts relating, for example, to the operation of its network interfaces and processors. Packeteer's Report-Center™ leverages the powerful network utilization and application performance statistics available in Packetshaper® bandwidth management devices and offers a centralized reporting platform to monitor and manage large deployments efficiently by streamlining collection, collation, storage, analysis, and distribution of measured statistics.

While the measurement engine is sufficient to achieve its intended purpose, some useful data for analyzing network usage and/or diagnosing problems is not available historically, but is only kept in memory while the PacketSeeker, PacketShaper or other bandwidth management device is running. In particular, the reports on "top talkers" and "traffic history" are not available for specific intervals in the past nor available after the device crashes, possibly due to some kind of attack or power outage. Furthermore, data maintained by the measurement engine, is generally not flow-based, and cannot answer questions like "which clients are running port scanners." Furthermore, as discussed above, NetFlow records characterize individual flows; however, standard NetFlow records cannot answer such questions or others requiring classification of flows beyond the attributes maintained by NetFlow records.

In light of the foregoing, a need in the art exists for methods, apparatuses and systems that enable a flow-based, traffic-classification-aware data collection and reporting system. A need further exists in the art for methods, apparatuses and systems allowing for enhanced informational queries relating to the operation of networks. Embodiments of the present invention substantially fulfill these needs.

SUMMARY OF THE INVENTION

The present invention provides methods, apparatuses and systems directed to a flow-based, traffic-classification-aware data collection and reporting system. Embodiments of the present invention combine flow-based data collection technologies with enhanced traffic classification functionality to allow for analysis and reporting into aspects of network operations that prior art systems cannot provide. Embodiments of the present invention provide deeper insight into the operation of computer networks and the application traffic traversing the networks. Embodiments of the present invention provide enhanced views into the operation of computer network infrastructures to facilitate monitoring, administration, compliance and other tasks associated with networks. In one embodiment, when a traffic flow terminates, a traffic monitoring device emits a flow data record (FDR) containing measurements variables, classification information, and other attributes for an individual flow. A data collector gathers the flow data records and enters them into a database. A network management application can then query the database with selected commands to derive reports characterizing operation of the network suitable to diagnose problems or view conditions associated with the network.

DESCRIPTION OF THE DRAWINGS

FIG. 1A is a functional block diagram showing a traffic monitoring device according to an embodiment of the present invention.

FIG. 1B is a functional block diagram illustrating a computer network environment including a bandwidth management device according to an embodiment of the present invention.

FIG. 2 is an functional block diagram illustrating a computer network environment including a bandwidth management device and a data collector.

FIG. 3 is a functional block diagram setting forth the functionality in a bandwidth management device according to an embodiment of the present invention.

FIG. 4 is a flow chart diagram providing a method, according to an embodiment of the present invention, directed to the processing of packets.

FIG. 6 is a flow chart diagram illustrating a method directed to enforcement of bandwidth utilization controls on network traffic traversing an access links.

FIG. 7 is a flow chart diagram providing a method directed to processing messages including flow data records.

DESCRIPTION OF PREFERRED EMBODIMENT(S)

Figure 5:
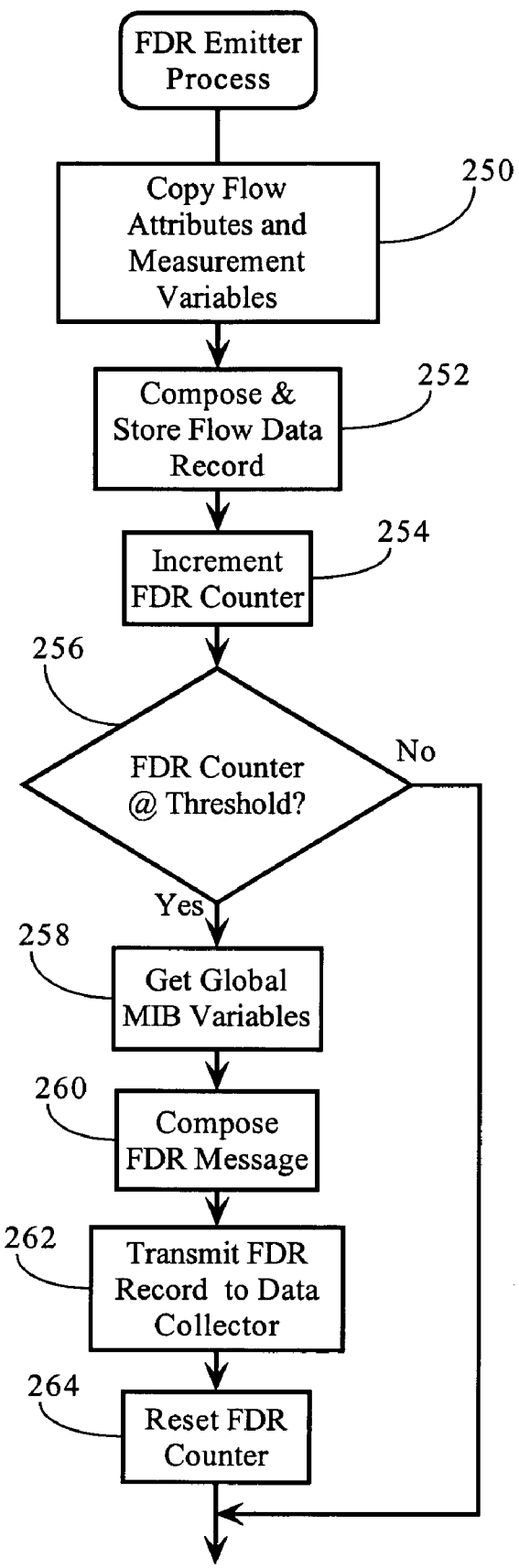
FIG. 5 is a flow chart diagram showing a method, according to an embodiment of the present invention, directed to composing and transmitting flow data records to a data collection node.

FIG. 1A illustrates a basic network environment in which an embodiment of the present invention operates. FIG. 1A shows a first network device 40, such as a hub, switch or router, interconnecting two end-systems (here, client computer 42 and host 44). FIG. 1A also provides a second network device 22, such as a router, operably connected to network cloud 50, such as an open, wide-area network. As FIG. 1A shows, packet traffic monitoring device 30 comprises traffic monitoring module 75, and first and second network interfaces 71, 72, which operably connect traffic monitoring device 30 to the communications path between first network device 40 and second network device 22. Traffic monitoring module 75 generally refers to the functionality implemented by traffic monitoring device 30. In one embodiment, traffic monitoring module 75 is a combination of hardware and software, such as a central processing unit, memory, a system bus, an operating system and one or more software modules implementing the functionality described herein. In one embodiment, traffic monitoring module 75 includes a packet processor 82, a traffic type identifier 84, and a flow data record emitter 86. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the flows. The traffic type identifier 84, as discussed more fully below, is operative to classify data flows based on one or more attributes associated with the data flows. The flow data record emitter 86 is operative to compose flow data records characterizing the data flows that traverse the traffic monitoring module 30, and transmit the flow data records to a data collection node, such as data collector 44.

As discussed below, the functionality of traffic monitoring device 30 can be integrated into a variety of network devices, such as firewalls, gateways, proxies, packet capture devices (see U.S. application Ser. No. 10/453,345) and bandwidth managers, that are typically located at strategic points in computer networks. In one embodiment, first and second network interfaces 71, 72 are implemented as a combination of hardware and software, such as network interface cards and associated software drivers. In addition, the first and second network interfaces can be wired network interfaces, such as Ethernet interfaces, and/or wireless network interfaces, such as 802.11, BlueTooth, satellite-based interfaces, and the like. As FIG. 1A illustrates, traffic monitoring device 30, in one embodiment, includes persistent memory 76, such as a hard disk drive or other suitable memory device, such writable CD, DVD, or tape drives. In one embodiment, traffic monitoring device 30 collects and transmits flow data records to a remote, persistent data store, for example, in datagrams, XML messages and the like. FIGS. 1B and 2 illustrate an operating environment where traffic monitoring device 30 is a bandwidth management device 130 (see discussion below).

As FIGS. 1A, 1B and 2 show, the traffic monitoring device 30 (or bandwidth management device 130), in one embodiment, is disposed on the link between a Local area network 40 and router 22. In other embodiments, multiple traffic monitoring devices can be disposed at strategic points in a given network infrastructure to achieve various objectives. In addition, packet monitoring device 30 need not be directly connected to the link between two network devices, but may also be connected to a mirror port. In addition, the traffic monitoring functionality described herein may be deployed in multiple network devices and used in redundant network topologies by integrating the network traffic synchronization functionality described in U.S. application Ser. No. 10/611, 573, above.

A. Flow-Based Traffic Monitoring

As discussed herein, traffic monitoring device 30 is operative to detect or recognize flows between end systems, classify the data flows based on one or more flow attributes and, upon the termination of individual flows, compose flow data records including data fields characterizing one or more attributes associated with the individual flows. The flow data records, in one embodiment, are ultimately transmitted to a data collector 44 which stores the data in a database allowing applications to query the database to generate reports characterizing the operation of the network in a variety of ways that were not possible prior to the invention described herein. FIG. 4 illustrates a method, according to an embodiment of the present invention, directed to a flow-aware process that classifies flows and notifies a flow data record emitter that a flow has ended. FIG. 5 provides a method, according to an embodiment of the present invention, directed to composing flow data records and transmitting a plurality of flow data records in a datagram to a remote data collector 44.

As FIG. 4 illustrates, a packet processor 82 receives a data packet (102) and determines whether a flow object has already been created for the flow to which the data packet is a part (104). A flow object is a data structure including fields whose values characterize various attributes of the flow, including source and destination IP addresses, port numbers, traffic type identifiers and the like. A flow object can also include other attributes, such as packet count, byte count, first packet time, last packet time, etc. If a flow object is not found, packet processor 82 constructs a new flow object (106). Packet processor 82 then determines whether the received packet is part of an existing flow or a new data flow (108). In one embodiment, flows are generally TCP and UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (110). For example, the packet processor 82, in one embodiment, increments the packet count associated with the flow (116). If the packet represents a new data flow, traffic type identifier 84 operates on the flow object and, potentially, attributes of the packet and other packets associated with the flow to determine a traffic type and/or traffic class associated with the flow (114). In one embodiment, the packet (or a pointer to the packet stored in a buffer structure) and the flow object (or a pointer thereto) is passed to the traffic type identifier 84 to determine a traffic type. As discussed in more detail below, identification of a traffic class or type can employ information gleaned from Layers 2 thru 7 of the OSI reference model. The determination of traffic types and traffic classes is discussed in more detail below at Sections B.1. and B.3. Similarly, if the packet represents a change to the data flow (112), packet processor 82 passes the packet and flow object to the traffic type identifier 84 to determine the traffic type. Packet processor 82 then records or updates various flow measurement variables, such as packet count, byte count, last packet time and the like (116). As FIG. 4 illustrates, if the packet indicates the end of the flow (118), packet processor 82 notifies the flow data record emitter 86 (120).

FIG. 5 provides a method, according to an embodiment, performed by flow data record emitter 86 in response to a notification from packet processor 82 that a flow has ended. As discussed above, while a flow is active, packet processor 82 processes the packets and records flow measurements variables in a flow object associated with the flow. When the flow is terminated, packet processor 82 signals the flow data record emitter 86, passing it a pointer to the flow object in a buffer structure. As FIG. 5 illustrates, when signaled, the flow data record emitter 86 copies the flow attribute and measurement variables from the flow object needed to compose a flow data record from the buffer (250). In one embodiment, when the data is copied, flow data record emitter 86 signals packet processor 82, which releases the pointer to the flow object in the buffer space allocated the flow object space back to the pool of available pointers for use with a new flow. Flow data record emitter 86 then composes a flow data record for the flow and stores it in memory (252).

A.1. FDR Emitter

As FIG. 5 illustrates, flow data record emitter 86 essentially composes and collects a plurality of flow data records, and transmits the plurality of flow data records in a flow data record (FDR) message to a data collector 44. Specifically, and in one implementation, flow data record emitter 86 maintains a FDR counter (254) to track the number of flow data records stored in memory. When the FDR counter reaches a predetermined threshold (256), flow data record emitter composes a flow data record message including the collected flow data records. In one embodiment, the flow data record message comprises a header including an identifier for traffic monitoring device 30 and global data non-specific to the flow data records (such as, system uptime, CPU idle time, a time stamp, and the like). The body of the FDR message comprises up to a threshold number of flow data records. The threshold number of flow data records can be set to different values to achieve a variety of objectives. In one embodiment, an FDR message is a single UDP datagram; accordingly, the threshold or maximum number of flow data records depends on the maximum transmit unit (MTU) supported by the computer network environment, the size of the FDR message header, and the individual sizes of the flow data records. When the FDR counter reaches a threshold value (256), flow data record emitter 86, accesses predetermined MIB variables (258), as discussed above, and composes a FDR message including the global variables and the flow data records (260). Flow data record emitter 86 then transmits the FDR message to a data collector (262) and resets the FDR counter (264).

B. Integration of Flow-Based Packet Capture and Bandwidth Management Devices

As discussed above, the traffic monitoring and flow data record functionality described above, in one embodiment, can be integrated into a bandwidth management device 130 operative to manage data flows traversing access link 21. The above-identified, commonly-owned patents and patent applications disclose the functionality and operation of bandwidth management devices. FIGS. 1B and 2 set forth a packet-based computer network environment including a bandwidth management device 130. As FIG. 2 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 130 is provided between router 22 and local area computer network 40. Bandwidth management device 130 is operative to classify data flows and, depending on the classification, enforce respective bandwidth utilization controls on the data flows to control bandwidth utilization across and optimize network application performance across access link 21.

FIG. 3 is a block diagram illustrating functionality, according to one embodiment of the present invention, included in bandwidth management device 130. In one embodiment, bandwidth management device 130 comprises packet processor 131, flow control module 132, measurement engine 140, traffic classification engine 137, management information base (MIB) 138, flow data record (FDR) emitter 139, and administrator interface 150. Packet processor 131 is operative to detect new data flows and construct data structures including attributes characterizing the data flow. Flow control module 132 is operative to enforce bandwidth utilization controls on data flows traversing bandwidth management device 130. Traffic classification engine 137 is operative to analyze data flow attributes and identify traffic classes corresponding to the data flows, as discussed more fully below. In one embodiment, traffic classification engine 137 stores traffic classes associated with data flows encountered during operation of bandwidth management device 130, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 130. FDR emitter 139 is operative to compose flow data records including attributes characterizing individual data flows, as discussed above, and transmit the flow data records to a data collector. Measurement engine 140 maintains measurement data relating to operation of bandwidth management device 130 to allow for monitoring of bandwidth utilization across access link 21 with respect to a plurality of bandwidth utilization and other network statistics on an aggregate and/or per-traffic-class level. Bandwidth management device 130, in one embodiment, further includes a persistent data store (not shown), such as a hard disk drive, for non-volatile storage of data.

Administrator interface 150 facilitates the configuration of bandwidth management device 130 to adjust or change operational and configuration parameters associated with the device. For example, administrator interface 150 allows administrators to select identified traffic classes and associate them with bandwidth utilization controls (e.g., a partition, a policy, etc.). Administrator interface 150 also displays various views associated with a hierarchical traffic classification scheme and allows administrators to configure or revise the hierarchical traffic classification scheme. Administrator interface 150 can be a command line interface or a graphical user interface accessible, for example, through a conventional browser on client device 42.

B.1. Packet Processing

In one embodiment, when packet processor 131 encounters a new data flow it stores the source and destination IP addresses contained in the packet headers in host database 134. Packet processor 131 further constructs a control block (flow) object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 131, in one embodiment, reserves memory space in the dynamic memory pool for storing such variably-sized attribute information as flows traverse bandwidth management device 130. Packet processor 131 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, incorporated by reference herein, disclose classification of data flows for use in a packet-based communications environment. FIG. 2 illustrates the concept associated with inside and outside addresses. As discussed above, in one embodiment, a flow specification object includes an "inside" and "outside" address relative to bandwidth management device 130. See FIG. 2. For a TCP/IP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 130 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat.

No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 130 includes functionality allowing for classification of network traffic based on information from layers 2 to 7 of the OSI reference model.

In one embodiment, bandwidth management device 130 is configured to include a predefined set of traffic classes based upon a knowledge base gleaned from observation of common or known traffic types on current networks. Bandwidth management device 130, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees.

Traffic classification database 137 stores traffic classes associated with data flows that traverse access link 21. Traffic classification database 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.4. Enforcement of Bandwidth Utilization Controls

FIG. 6 illustrates a method, according to one embodiment of the present invention, directed to the enforcement of bandwidth utilization controls on data flows transmitted across access link 21 and, therefore, traversing bandwidth management device 130. The method for enforcing bandwidth utilization controls, however, is not critical to the present invention; any suitable method can be employed.

In one embodiment, packet processor 131 receives a data packet (FIG. 6, 202) and determines whether flow database 135 contains an existing control block object corresponding to the data flow (204) (see Section B.1., supra). If no control block object corresponds to the data packet, packet processor 131 constructs a control block object including attributes characterizing the data flow, such as source address, destination address, service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 6 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In one embodiment, if the last packet time does exceed a threshold, this signals to the packet processor 131 that the previous flow has terminated, causing the packet processor 131 to notify FDR emitter 139. In another embodiment, a separate process monitors the last packet times associated with UDP, GRE and similar flow types to detect termination of a given flow. In some embodiments, packet processor 131 may have to encounter multiple packets to identify and fully characterize a new data flow (e.g., identify a service type, traffic class, etc.). For example, U.S. Pat. No. 6,046,980 and U.S. Pat. No. 6,591,299, identified above, discloses methods for classifying packet network flows.

If the data packet does not signify a new data flow, packet processor 131 retrieves the control block object, and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of multipurpose internet mail extensions (MIME) types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes (216).

Packet processor 131 then passes the packet to rate control module 132 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 6 illustrates, packet processor 131 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

As FIG. 6 illustrates, at the termination of a flow (226), packet processor 131 notifies FDR emitter 139 (228), which operates as discussed above, to copy relevant attributes of the control block object stored in the buffer and compose a flow data record. Detecting the termination of a flow depends on the type of flow. For example, the termination of TCP flows can be detected by inspecting for FIN packets. Termination of UDP or GRE flows can be detected relative to a threshold period of time between packets (see above). FDR emitter 139, in one embodiment, operates as discussed above to compose and store flow data records and ultimately transmit the flow data records to a remote data collector 44. The contents of the flow data records, and FDR messages, according to an embodiment of the present invention is described in Section C., below.

C. Flow Data Records and Data Collection

C.1. Flow Data Records

Bandwidth management device 130 can be configured to send flow data records in a variety of formats. For example and in one embodiment, the flow data records can be formatted such that the records are a superset of Cisco Systems, Inc.'s NetFlow 5 format (or other NetFlow format), which contain additional fields such as the ClassId of the traffic class and/or serviceId matching the flow. However, since bandwidth management device 130 is not a router the flow data records do not include certain routing information such as the IP address of the next hop router (nexthop values), or autonomous system (AS) number information. In one embodiment, such nexthop and AS values are set to zero. However, if the traffic monitoring and flow data record functionality described herein were incorporated into a router, the flow data records could also include such routing-related information. Appendix A sets forth the elements and structure of a flow data record, as well as a FDR message comprising a plurality of flow data records, according to an embodiment of the present invention. As Appendix A illustrates, a FDR message includes a message header and a message body. The message body contains up to a maximum number (kPacketeer2MaxCount) of flow data records. As discussed above, the flow data records, in one embodiment, are fixed-size records. Accordingly, the maximum number of flow data records in a FDR message depends on the maximum size of the FDR message and the size of the flow data record. In one embodiment, each FDR message is a UDP datagram; accordingly, the maximum size of the FDR message, in one embodiment, is limited by the MTU supported by the network environment.

As Appendix A further illustrates, the FDR message header includes measurement variables and other attributes, such as the sequence number of the first flow data record in the message, and MIB variables, such as sysUptime, unix_secs, unix_nsecs, and cpuIdlePercent. The FDR message header, in one embodiment, further includes measurement variables or statistics relating to the access link 21 in both the inbound and outbound directions. For example, the FDR message header may report the overall usage or toad of the link (kStatTypeLinkUsage), and/or a compression ratio (kStateTypeCompressionPercent). Either or both values may be weighted moving averages or exponential weighted moved averages.

As discussed above, Appendix A also provides the elements of an individual flow data record, according to an embodiment of the present invention. A flow data record includes the traffic classification identifier (classed) corresponding to the traffic class associated with the flow (see Section B.3. above). In one embodiment, the value of classId is an integer or other unique alphanumeric string that maps to a traffic class name, such as "Inbound/FTP", "Outbound/HTTP", or other manually configured traffic class names. In one embodiment, flow data records further include the service type identifier (serviceId) corresponding to the flow (see Section B.1., above). As with traffic classifications, the serviced, in one embodiment, is an integer value that maps to a service type name (such as Kazaa, Citrix, HTTP, FTP, etc.). The use of integers as traffic class and service type identifiers allows the size of the flow data records to be fixed in size. Of course, in other embodiments, the flow data records can include variable-length fields including the actual name of the traffic class or service type identifiers. As discussed below, the use of integers or other fixed-length strings to identify a traffic class or service type requires a means of mapping the traffic class and service type identifiers to the respective traffic class and service names, since these names may and often do change over time, and/or may not be consistent in managed network environments including more than one bandwidth management device. In one embodiment, FDR emitter 139 is configured to transmit mapping messages to the data collector 44 specifying the mapping between the traffic class and service type identifiers to the respective traffic class and service names. In other embodiments, the requisite mapping data may be obtained from FDR emitter 139 through other suitable means, such as a separate file, cgi request, etc.

In one embodiment, each flow data record includes an indicator (serverside) of whether the source (s) or destination (d) host is the server in the transaction. In TCP flows, the client is the host transmitting the SYN packet, while the server transmits the SYN/ACK packet. Of course, other methods of determining the server and client can include inspecting information from other layers in the packet such as HTTP headers and commands, such as GET, POST, etc.

In one embodiment, each flow data record also includes a measurement type identifier (measType) indicating the significance of the measurement variables, Measurement1, Measurement2, and Measurement3. The measurement type depends on the nature or type of the flow. For example, kMeasurementTypePing applies to data flows associated with ICMP echo flows, and characterizes ping success and delay. kMeasurementTypeRTCP applies to data flows using Real Time Control Protocols (RTCP), such as VoIP calls, and allows for an assessment of VoIP quality. kMeasurementTypeRTM applies to data flows associated with request-response or transaction-type TCP flows, such as HTTP, POP3, SMTP, etc. Lastly, kMeasurementTypeTCP applies to all other TCP flows that do not involve request-response exchanges or transactions, such as FTP data flows.

C.1. Mapping Messages

As discussed above, FDR emitter 139, in one embodiment, transmits mapping messages specifying the mappings from classIds to traffic class names. In one embodiment, these mappings are transmitted on a periodic basis to data collector 44. In addition, these mapping messages can be transmitted in response to changes to the traffic classification hierarchy maintained by traffic classification database 137 when for example a network administrator changes a traffic class name, deletes a traffic class and/or adds a traffic class. In one such embodiment, traffic classification database 137 notifies FDR emitter 139 of any changes, which causes FDR emitter 139 to transmit a mapping message specifying the new or changed mapping. In addition, mapping messages may also specify new or changed mappings between serviceIDs and the corresponding service type identifiers. For example, the service tables may be updated as a result of a new software image version (including new service tables) being installed on bandwidth management device 30. Mapping messages may also be used to specify new or changed mappings between interface identifiers and interface names. Mapping messages, in one embodiment, include a unique identifier for bandwidth management device 130, and a time stamp.

The mapping messages allow the data collector and flow data record database to resolve the associations between classIds and the present traffic class name to allow applications to generate queries using the traffic class name across time and/or across multiple bandwidth management or other traffic monitoring devices. That is, since the mappings between classIds and traffic class names change over time (or may be different across traffic monitoring devices), the mapping messages can be used to keep track of the stored data and allow for meaningful historical searches. Because every flow data record and mapping message, in one embodiment, has a time stamp, the database can determine the classId values that correspond to a given traffic class name or string over time and/or across multiple bandwidth management or other traffic monitoring devices. The mapping messages can be used to specify any required mappings, such as serviceIds to service names. For example, a search query involving a search for any service name including "FTP" causes the database to search its mapping tables for all serviceIds that map to a service name including "FTP," and then (using a SQL join, for example), searches for all flow data records that include the matching serviceIds.

C.2. Data Collector

Data collector 44 listens for FDR messages and stores them in a searchable database. In one embodiment, data collector 44 is a Linux host which saves the flow data records in a SQL database. As one skilled in the art will recognize, however, a variety of host platforms and databases can be used to implement the data collector 44. As discussed in more detail below, various queries can be made to the database to answer interesting questions. For example, a network management application can then query the database with SQL commands, for example, to derive reports similar to "top talkers", "traffic history", and others reports detailing the operation or loading conditions associated with a network.

FIG. 7 sets forth a method, according to an embodiment of the invention, executed by data collector 44 for receiving and processing messages transmitted by bandwidth management device 130. As FIG. 7 illustrates, when data collector 44 receives a message (302), it determines whether the message is a mapping message (304) or a FDR message (308). If the message is a mapping message, data collector 44 stores the mapping message in an appropriate mapping table in association with the time stamp and a device identifier contained in the mapping message (306). If the message is a FDR message, data collector 44 parses the message to store the data fields in the FDR message header in one or more header tables (310), and stores the data fields in the flow data records in the FDR message body in one or more flow data record tables (312). The flow data records are stored in association with the device identifiers and time stamps in the FDR message header to allow for searches on a time basis and/or on a per-device basis.

C.3. Flow Data Record Database

The data fields of the FDR message header and the individual flow data records allow for searches to generate useful data for diagnosing problems or conditions encountered in computer networks. For example, the data stored in the flow data record database allows for reports on top talkers and traffic history over specific intervals in the past. In addition, since flow data records are periodically transmitted to a remote data collector, the analysis data is available although one or more devices have rebooted or been reset. As discussed below, access this historical data can be very helpful in diagnosing problems and recognizing trends. For example, historical data available in flow data records can answer questions like:

What class had the most connections (class hits) yesterday?

What clients have been "port scanning"?

What are the most recent flows the bandwidth management device couldn't classify by service?

What servers are using port 80 for non-HTTP traffic?

C.3.a. Pulling Data from the Database

The commands requesting data from the database, in one embodiment, are divided into two categories, qualifiers and queries.

Qualifiers restrict the scope of the queries to a subset of the recorded data—otherwise everything in the database is considered input.

Queries generate output, in one embodiment, in the form of text tables. A PHP interface to the database can be used to output data to HTML pages.

In the embodiment shown, all the sample queries are simple shell scripts. Users can create their own queries, and are not Limited to the examples described herein. In one embodiment, once a qualifier is specified, it becomes "sticky" and applies to all subsequent queries until it is changed with another Qualifier command. In one embodiment, users are limited to only one qualifier of the "by" type per query to the database. Table 1 provides a list of Qualifiers according to an embodiment of the present invention.

TABLE 1

| Qualifier | Description |
| --- | --- |
| between | Restricts the time period to a specified interval |
| byaddress | Limits queries to a specified IP or subnet |
| byclass | Restricts queries to traffic matching one or more traffic classes. This query will summarize any children of the specified traffic class. |
| byinterface | Restricts queries to a specific interface or set of interfaces. |
| byservice | Limits query to traffic for a particular service type. Note that the service is a regular expression, so byservice netbios will match NetBIOS-IP, NetBIOS-IP-NS, NetBIOS-IP-DGM, and NetBIOS-IP-SSN. |
| limit | Limits output to a specified number of entries. The default value is 25. |
| shaper | Specify an IP address or CIDR subnet to query data from one or more bandwidth management devices. |
| byvlan | Limits consideration to traffic marked with a specific VlanId |

Tables 2 and 3 below describes two types of queries. Flow queries (Table 2) allow users to review data in the flow data records. Sample queries (Table 3) do not actually look at the flow data records, but at the global statistics sent in the FDR message headers.

TABLE 2

| Flow Query | Description |
| --- | --- |
| toplisteners | Displays top traffic destinations as bytes of traffic sent to specified IP addresses |
| toptalkers | Displays top traffic sources as bytes of traffic sent from specified IP addresses |
| topclasses | Displays busiest traffic classes |
| topservices | Displays service types with the greatest number of traffic flows |
| topinsiderservers | Traffic sent by hosts on the inside, sorted by number of connections |
| historyrecent | Shows per-flow address and port information for the most recent flows within a selected time period |
| mostretransmissions | Flows experiencing the most retransmitted bytes |
| serviceunknown | Shows per-flow address and port data for flows that bandwidth management device could not classify to a named service |
| nonweb | Displays a list of servers that are running the most flows of non-HTTP traffic on port 80 |
| policysummary | Summarizes traffic by bandwidth management policy or other control |
| scanners | Lists hosts that seem to be "port scanning" by number of connections initiated to invalid TCP ports |
| walkers | Lists hosts that are "walking," that is, have tried to connect with the greatest number of distinct partners |
| floodedservers | Displays servers that were targeted by a DoS flooding attack |
| floodingclients | Displays clients causing a DoS flooding attack |

TABLE 3

| Sample Query | Qualifiers/Description |
| --- | --- |
| busytime | Shows CPU idle time percentages for each specified bandwidth management device within a selected interval |
| linkutilization | Shows link utilization percentages for each specified bandwidth management device within a selected interval |

Table 4 provides certain Measurement Queries to retrieve per-flow RTM and other measurements. These also allow users to select a "group by" choice to aggregate the results by IP address, traffic class, or service name.

TABLE 4

| Measurement Query | Description |
| --- | --- |
| congestionindex | Shows the average Congestion Index |
| connectionfailures | Displays total TCP connection failures |
| diffservsummary | Displays flow count by DSCP grouped by your grouping selection |
| pingtimes | Displays average ping time and success percentage |
| serverdelay | Displays number of connections, transactions, and average server delay |
| transactiondelay | Displays number of connections, average transaction delay, and transaction delay per packet |
| voiptimes | Displays average jitter, delay, and packet loss percentage |

The SQL queries, in one embodiment, are simple shell scripts. For example, the script for the "scanners" Flow Query, in one embodiment, is:

```
echo
echo ' *((' Port Scanners '))*'
echo
cat $t-n-between
cat $t-n-shaper
cat $t-n-limit
echo
cat >$t-query <<!
BEGIN;
'cat $t-between $t-shaper'
CREATE TEMP TABLE reset AS
    SELECT * FROM flags
    WHERE TCPState ~* 'RST';
CREATE VIEW single AS
    SELECT * FROM records
    WHERE ServerSide = 's' AND Packets = 1;
SELECT DestinationAddress AS Client, count(*) AS Connections,
min(FirstTime) AS Earliest, max(FirstTime) AS Latest
    FROM single JOIN reset USING (TCPFlags)
    GROUP BY Client
    ORDER BY Connections DESC
    'cat $t-limit';
ROLLBACK;
!
psql -q -d cdr -f $t-query
```

Additionally, the script, according to one implementation, for the "topservices" query is:

```
echo
echo ' *((' Top Traffic Services '))*'
echo
cat $t-n-between
cat $t-n-shaper
cat $t-n-by
cat $t-n-limit
echo
cat >$t-query <<!
BEGIN;
'cat $t-between $t-shaper $t-by'
'cat $t-s-by'
CREATE VIEW named AS
    SELECT * FROM by JOIN protocols USING (IPProtocol);
CREATE VIEW trimmed AS
    SELECT Shaper, ServiceIndex, ServiceName FROM services;
SELECT count(*) AS Connections, sum(Octets) AS Bytes, ProtocolName,
ServiceName
    FROM named JOIN trimmed USING (Shaper, ServiceIndex)
    GROUP BY ProtocolName, ServiceName
    ORDER BY Connections DESC
    'cat $t-limit';
ROLLBACK;
!
psql -q -d cdr -f $t-query
```

In addition, a script, according to an implementation, for the "pingtimes" query is:

```
echo
echo ' *((' Ping Success Percentage and Times '(ms.)' '))*'
echo
cat $t-n-between
cat $t-n-shaper
cat $t-n-by
cat $t-n-group
cat $t-n-limit
echo
sed -e 's/Address/DestinationAddress AS Address/' <$t-g-group >$t-a-group
cat >$t-query <<!
BEGIN;
'cat $t-between $t-shaper $t-by'
'cat $t-s-by'
CREATE VIEW slice AS
    SELECT * FROM by 'cat $t-j-group'
    WHERE MeasurementType = 'p' AND ServerSide = 'd';
SELECT sum(Packets) AS Packets, avg(Measurement3) AS Success,
avg(Measurement1) AS Time
    'cat $t-a-group'
    FROM slice
    'cat $t-group'
    ORDER BY Time DESC
    'cat $t-limit';
ROLLBACK;
!
psql -q -d cdr -f $t-query
```

Still further, a script implementing the congestion index query, according to one implementation, is:

```
echo
echo ' *((' Congestion Index '))*'
echo
cat $t-n-between
cat $t-n-shaper
cat $t-n-by
cat $t-n-group
cat $t-n-limit
echo
```

```
sed -e 's/Address/DestinationAddress AS Address/' <$t-g-
group >$t-a-group
cat >$t-query <<!
BEGIN;
'cat $t-between $t-shaper $t-by'
'cat $t-s-by'
CREATE VIEW slice AS
    SELECT * FROM by 'cat $t-j-group'
    WHERE MeasurementType = 'a' OR MeasurementType
      = 't';
SELECT count(*) AS Connections, avg(Measurement3) AS
CongestionIndex
    'cat $t-a-group'
    FROM slice
    'cat $t-group'
    ORDER BY CongestionIndex DESC
    'cat $t-limit';
ROLLBACK;
!
psql -q -d cdr -f $t-query
```

In addition, the following provides scripts, according to one implementation, that support the query scripts set forth above. For example, the "cdr" script sets the environment or temporary directory (t) and initializes certain variables, such as "limit."

```
t=/tmp/cdr-$$
PATH=/usr/local/share/cdr/bin:$PATH
export t PATH
between any
shaper any
byclass any
groupby none
limit 25
PS1='CDR> ' $SHELL
rm $t-*
```

The remaining scripts implement certain qualifiers set forth in Table 1, above. Qualifier: between

```
case "$1" in
any)
cat >$t-between <<!
CREATE VIEW tween AS
    SELECT * FROM flows;
!
cat >$t-h-between <<!
CREATE VIEW tween AS
    SELECT * FROM samples;
!
echo '*' Any time >$t-n-between
;;
*)
cat >$t-between <<!
CREATE VIEW tween AS
    SELECT * FROM flows
    WHERE FirstTime <= '$2' AND LastTime >= '$1';
!
cat >$t-h-between <<!
CREATE VIEW tween AS
    SELECT * FROM samples
    WHERE SampleTime <= '$2' AND SampleTime >= '$1';
!
echo '*' Between $1 and $2>$t-n-between
esac
```

Qualifier: shaper

```
case "$1" in
any)
cat >$t-shaper <<!
CREATE VIEW records AS
    SELECT * FROM tween;
!
echo '*' Any shaper >$t-n-shaper
;;
*)
cat >$t-shaper <<!
CREATE VIEW records AS
    SELECT * FROM tween
    WHERE Shaper <<= '$1';
!
echo '*' Shaper $1>$t-n-shaper
esac
```

Qualifier: limit

```
case "$1" in
none)
echo >$t-limit
echo '*' All records >$t-n-limit
;;
*)
echo "LIMIT $1" >$t-limit
echo '*' Limit $1>$t-n-limit
esac
```

Qualifier: byaddress

```
case x$2 in
xs*)
sd="SourceAddress <<= '$1'"
n="as source"
;;
xd*)
sd="DestinationAddress <<= '$1'"
```

```
n="as destination"
;;
sd="SourceAddress <<= '$1' OR DestinationAddress <<= '$1'"
n=
esac
case "$1" in
any)
cat >$t-by <<!
CREATE VIEW by AS
    SELECT * FROM records;
!
echo '*' Any address >$t-n-by
echo >$t-s-by
;;
*)
cat >$t-by <<!
CREATE VIEW by AS
    SELECT * FROM records
    WHERE $sd;
!
echo '*' Address $1 $n>$t-n-by
echo >$t-s-by
esac
Qualifier: byclass
case "$1" in
any)
cat >$t-by <<!
CREATE VIEW by AS
    SELECT * FROM records;
!
echo '*' Any class >$t-n-by
echo >$t-s-by
;;
*)
cat >$t-by <<!
CREATE TEMP TABLE selection AS
    SELECT Shaper, ClassID, ClassName AS ByWhat
    FROM classes WHERE ClassName ~* '$1';
CREATE VIEW by AS
    SELECT * FROM records NATURAL JOIN selection;
!
echo '*' Class $1 >$t-n-by
echo "SELECT Shaper, ByWhat AS ClassName FROM selection;" >$t-s-by
esac
Qualifier: byservice
case "$1" in
any)
cat >$t-by <<!
CREATE VIEW by AS
    SELECT * FROM records;
!
echo '*' Any service >$t-n-by
echo >$t-s-by
;;
*)
cat >$t-by <<!
CREATE TEMP TABLE selection AS
    SELECT Shaper, ServiceIndex, ServiceName AS ByWhat
    FROM services WHERE ServiceName ~* '$1';
CREATE VIEW by AS
    SELECT * FROM records NATURAL JOIN selection;
!
echo '*' Service $1 >$t-n-by
echo "SELECT Shaper, ByWhat AS ServiceName FROM selection;" >$t-s-by
esac
Qualifier: byinterface
case "${2:-any}" in
any)
w="(InterfaceNumber = InputInterface OR InterfaceNumber = OutputInterface)"
;;
in*)
w="InterfaceNumber = InputInterface"
;;
out*)
w="InterfaceNumber = OutputInterface"
;;
*)
echo Second parameter is direction choice 1>&2
esac
case "$1" in
any)
cat >$t-by <<!
CREATE VIEW by AS
    SELECT * FROM records;
!
echo '*' Any interface >$t-n-by
echo >$t-s-by
;;
*)
cat >$t-by <<!
```

```
CREATE TEMP TABLE selection AS
  SELECT InterfaceName, InterfaceNumber, Shaper AS Box
  FROM interfaces WHERE InterfaceName ~* '$1';
CREATE VIEW by AS
  SELECT * FROM records JOIN selection ON $w AND Shaper = Box;
!

echo '*' Interface $1 $2 >$t-n-by echo "SELECT Box AS Shaper, InterfaceName FROM selection;" >$t-s-by esac Qualifier: groupby case "$1" in a*)

echo 'GROUP BY Address' >$t-group echo ', Address' >$t-g-group echo >$t-j-group echo '*' Grouped by Address >$t-n-group

;;

c*)

echo 'GROUP BY ClassName' >$t-group echo ', ClassName' >$t-g-group echo 'NATURAL JOIN Classes' >$t-j-group echo '*' Grouped by Class Name >$t-n-group

;;

s*)

echo 'GROUP BY ServiceName' >$t-group echo ', ServiceName' >$t-g-group echo 'NATURAL JOIN Services' >$t-j-group echo '*' Grouped by Service Name >$t-n-group

;;

none)

echo >$t-group echo >$t-g-group echo >$t-j-group echo '*' Totals Only >$t-n-group esac
```

Lastly, although the present invention has been described as operating in connection with end systems and networks employing the HTTP, TCP and IP protocols, the present invention has application in computer network environments employing any suitable session layer, transport layer and network layer protocols. Moreover, one skilled in the art will recognize that other scripts can be developed to generate reports on the same, similar or different aspects of network operation. Furthermore, in Light of the foregoing exemplary scripts, one skilled in the art will recognize that a variety of queries can be created to gain insight into the operation of computer networks and the application traffic traversing the networks. Accordingly, the present invention has been described with reference to specific embodiments. Other embodiments of the present invention will be apparent to one of ordinary skill in the art. It is, therefore, intended that the claims set forth below not be limited to the embodiments described above.

APPENDIX A

```
typedef struct {
    u_int16_t    version;
#define  kPacketeer2Version        616
    u_int16_t    count;
#define  kPacketeer2MaxCount       22   /* maximum number of flow data records */
    u_int32_t    SysUptime;        /* time unites (msec) since device last booted */
    u_int32_t    unix_secs;
    u_int32_t    unix_nsecs;
    u_int32_t    flow_sequence;    /* sequence number of 1st record in FDR message */
    u_int8_t     cpuIdlePercent;   /* as in "sys health" */
    u_int8_t     statType;         /* type of data (U or C), in the next two bytes */
        #define      kStatTypeLinkUsage          'U'
        #define      kStatTypeCompressionPercent 'C'
    u_int8_t     statValueInbound;   /* value for Inbound direction */
    u_int8_t     stat ValueOutbound; /* value for Outbound direction */
    u_int32_t    unused1;
    u_int32_t    unused2;
}Packeteer2Header, *Packeteer2HeaderPtr;
typedef struct {
    u_int32_t    srcaddr;           /* source address */
    u_int32_t    dstaddr;           /* destination address */
    u_int32_t    classId;           /* traffic class ID */
    u_int16_t    input;             /* interface no. of ingress interface */
    u_int16_t    output;            /* interface no. of egress interface */
    u_int32_t    dPkts;             /* number of packets in flow */
    u_int32_t    dOctets;           /* number of bytes in flow */
    u_int32_t    First;             /* time of first packet in flow (in SysUptime) */
    u_int32_t    Last;              /* time of last packet in flow (in SysUptime) */
    u_int16_t    srcport;           /* source port number */
    u_int16_t    dstport;           /* source port number */
```

APPENDIX A-continued

```
u_int8_t    policy;              /* policy type */
    #define     kPolicyTypePriority         0x01
    #define     kPolicyTypeRate             0x02
    #define     kPolicyTypeUncontrolled     0x08
    #define     kPolicyTypeDiscard          0x10
    #define     kPolicyTypeNeverAdmit       0x20
    #define     kPolicyServerFlowLimited    0x30
    #define     kPolicyClientFlowLimited    0x31
    #define     kPolicyModifierShapingOff   0x80
u_int8_t    tcp_flags;           /* tracks TCP protocol messages */
u_int8_t    prot;                /* IP Protocol Field */
u_int8_t    tos;                 /* Type of Service */
u_int16_t   serviceId;           /* service type ID of flow */
u_int8_t    serverside;          /* side the server is on, either 's' or 'd' */
u_int8_t    priority;            /* of the policy */
u_int32_t   retxOctets;          /* retransmitted bytes */
u_int16_t   vlanId;              /* VLAN identifier in tag */
u_int8_t    ttl;                 /* ttl of received SYN or first packet */
u_int8_t    measType;            /* specific measurements in Measurement[123] */
    #define     kMeasurementTypePing        'p'
    #define     kMeasurementTypeRTCP        'v'
    #define     kMeasurementTypeRTM         'a'
    #define     kMeasurementTypeTCP         't'
u_int32_t   Measurement1;
u_int32_t   Measurement2;
u_int32_t   Measurement3;
}Packeteer2Record, *Packeteer2RecordPtr;
/*
```

* Semantics of the flow-specific measurements:

| measType | serverside | Measurement | |
|---|---|---|---|
| p | d | 1 | average delay (PS to dstaddr and back) |
|   |   | 2 | host speed (of srcaddr(client)) |
|   |   | 3 | success percentage (pings that had responses) |
| p | s | 2 | host speed (of srcaddr(server)) |
| v | d | 1 | average one-way delay |
|   |   | 2 | average jitter |
|   |   | 3 | percentage packet loss |
| a | d | 1 | average total transaction delay |
|   |   | 2 | average packets per response |
|   |   | 3 | congestion index (on dstaddr(server) side) |
| a | s | 1 | average server delay |
|   |   | 2 | transaction count |
|   |   | 3 | congestion index (on dstaddr(client) side) |
| t | d | 2 | host speed (of srcaddr(client)) |
|   |   | 3 | congestion index (on dstaddr(server) side) |
| t | s | 2 | host speed (of srcaddr(server)) |
|   |   | 3 | congestion index (on dstaddr(client) side) |

*/

What is claimed is:

1. A method enabling a flow-based data collection scheme, comprising
receiving a flow, the flow comprising at least one packet;
monitoring the flow in relation to at least one flow attribute;
associating a traffic type to the flow;
upon termination of the flow, composing a flow data record comprising a traffic type identifier corresponding to the traffic type associated with the flow and the at least one monitored flow attribute; and
storing the flow data record in a database;
wherein associating the traffic type to the flow comprises:
parsing at least one packet associated with the flow into a flow specification, wherein said flow specification contains at least one instance of any one of the following: a protocol family designation, a direction of packet flow designation, a protocol type designation, a pair of hosts, a pair of ports, a pointer to a multipurpose internet mail extensions (MIME) type, a pointer to an application-specific attribute;
matching the flow specification of the parsing step to a plurality of hierarchically-recognized traffic types represented by a plurality of nodes, each node having a traffic specification defining at least one matching attribute; thereupon,
having found a matching node in the matching step, associating the flow specification with a traffic type of said plurality of hierarchically-recognized traffic types.

2. The method of claim 1 wherein the at least one flow attribute is one of any of the following: a first packet time, a last packet time, the number of packets in the flow, the number of bytes in the flow, the number of retransmitted bytes in the flow, or a round trip time.

3. The method of claim 1 wherein the flow data record further includes one of any of the following: source address, destination address, source port number, destination port number, VLAN identifier, type of service identifier, a protocol family designation, a direction of packet flow designation, a protocol type designation, a protocol message designation, a first packet time, a last packet time, the number of packets in the flow, the number of bytes in the flow, the number of retransmitted bytes in the flow, or a round trip time.

4. The method of claim 1 wherein termination of the flow is determined based on a threshold period of time and the time of the last packet in the flow.

5. The method of claim 1 wherein termination of the flow is determined based on a protocol message.

6. The method of claim 5 wherein the protocol message is a TCP FIN packet.

7. The method of claim 1 wherein at least one mapping exists between a traffic type identifier transmitted in flow data records and a traffic type name; and wherein the method further comprises
periodically storing the at least one mapping in the database.

8. The method of claim 1 wherein at least one mapping exists between the traffic type identifier transmitted in flow data records and a traffic type name; and wherein the method further comprises
periodically transmitting the at least one mapping for storage in the database.

9. The method of claim 8 wherein the at least one mapping is transmitted in one or more mapping messages; and wherein the mapping messages further include time stamps.

10. A method enabling a flow-based data collection scheme, comprising
receiving a flow, the flow comprising at least one packet;
monitoring the flow in relation to at least one flow attribute;
associating a traffic type to the flow;
upon termination of the flow, composing a flow data record comprising a traffic type identifier corresponding to the traffic type associated with the flow and the at least one monitored flow attribute; and
storing the flow data record in a database;
parsing at least one packet associated with the flow into a first flow specification, wherein said first flow specification contains at least one instance of any one of the following: a protocol family designation, a direction of packet flow designation, a protocol type designation, a pair of hosts, a pair of ports, a pointer to a multipurpose internet mail extensions (MIME) type, a pointer to an application-specific attribute;
matching the first flow specification of the parsing step to a plurality of recognized traffic types represented by a plurality entries in at least one traffic type identification table, each entry in the traffic type identification table including at least one matching attribute; thereupon,
having found a matching traffic type in the matching step, associating the first flow specification with a traffic type of said plurality of recognized traffic types in the at least one traffic identification table.

11. An apparatus enabling a flow-based data collection scheme, comprising
a packet processor operative to
receive a flow, the flow comprising at least one packet;
associate a traffic type to the flow;
monitor the flow in relation to at least one flow attribute; and
a flow data record emitter operative to:
upon termination of the flow, compose a flow data record comprising a traffic type identifier corresponding to the traffic type associated with the flow and the at least one monitored attribute; and
transmit the flow data record to a data collectors wherein, to associate the traffic type to the flow, the packet processor is further operative to
parse at least one packet associated with the flow into a flow specification, wherein said flow specification contains at least one instance of any one of the following: a protocol family designation, a direction of packet flow designation a protocol type designation, a pair of hosts, a pair of ports, a pointer to a MIME type, a pointer to an application-specific attribute;
match the flow specification to a plurality of hierarchically-recognized traffic types represented by a plurality of nodes, each node having a traffic specification defining at least one matching attribute; thereupon,
having found a matching node in the matching step, associate the flow specification with a traffic type of said plurality of hierarchically-recognized traffic types.

12. The apparatus of claim 11 further comprising
a traffic classification database operative to
store mappings between traffic type names and traffic type identifiers;
classify the flow into the traffic type based on the at least one attribute of the flow; and
wherein the flow data record emitter is further operative to:
transmit the mappings between the traffic type names and traffic type identifiers to the data collector.

13. The apparatus of claim 11 wherein the at least one flow attribute is one of any of the following: a first packet time, a last packet time, the number of packets in the flow, the number of bytes in the flow, the number of retransmitted bytes in the flow, or a round trip time.

14. The apparatus of claim 11 wherein the flow data record further includes one of any of the following: source address, destination address, source port number, destination port number, VLAN identifier, type of service identifier, a protocol family designation, a direction of packet flow designation, a protocol type designation, a protocol message designation, a first packet time, a last packet time, the number of packets in the flow, the number of bytes in the flow, the number of retransmitted bytes in the flow, or a round trip time.

15. The apparatus of claim 11 wherein termination of the flow is determined based on a threshold period of time and the time of the last packet in the flow.

16. The apparatus of claim 11 wherein termination of the flow is determined based on a protocol message.

17. The apparatus of claim 16 wherein the protocol message is a TCP FIN packet.

18. An apparatus enabling a flow-based data collection scheme, comprising
a packet processor operative to
receive a flow, the flow comprising at least one packet;
associate a traffic type to the flow;
monitor the flow in relation to at least one flow attribute; and
a flow data record emitter operative to:
upon termination of the flow, compose a flow data record comprising a traffic type identifier corresponding to the traffic type associated with the flow and the at least one monitored attribute; and
transmit the flow data record to a data collector;
wherein, to associate the traffic type to the flow, the packet processor is further operative to
parse at least one packet associated with the flow into a first flow specification, wherein said first flow specification contains at least one instance of any one of the following: a protocol family designation, a direction of packet flow designation, a protocol type designation, a pair of hosts, a pair of ports, a pointer to a multipurpose internet mail extensions (MIME) type, a pointer to an application-specific attribute;

match the first flow specification to a plurality of recognized traffic types represented by a plurality entries in at least one traffic type identification table, each entry in the traffic type identification table including at least one matching attribute; thereupon, having found a matching traffic type in the matching step, associate the first flow specification with a traffic type of said plurality of recognized traffic types in the at least one traffic identification table.

19. A system enabling a flow-based data collection scheme, comprising at least one network device disposed in a communication path between first and second networks; the first network device comprising a packet processor operative to receive a flow, the flow comprising at least one packet;

associate a traffic type to the flow;

monitor the flow in relation to at least one flow attribute;

wherein, to associate the traffic type to the flow, the packet processor is further operative to parse at least one packet associated with the flow into a flow specification, wherein said flow specification contains at least one instance of any one of the following: a protocol family designation, a direction of packet flow designation, a protocol type designation, a pair of hosts, a pair of ports, a pointer to a multipurpose internet mail extensions (MIME) type, a pointer to an application-specific attribute;

match the flow specification to a plurality of hierarchically-recognized traffic types represented by a plurality of nodes, each node having a traffic specification defining at least one matching attribute; thereupon, having found a matching node in the matching step, associate the first flow specification with a traffic type of said plurality of hierarchically-recognized traffic types; and a flow data record emitter operative to:

upon termination of a flow, compose a flow data record comprising a traffic type identifier corresponding to the traffic type associated with the flow and the at least one monitored attribute; and transmit the flow data record to a data collector; and the data collector operative to:

receive flow data records from the first network device; and store the flow data records in a searchable database.

20. The system of claim 19 further comprising a traffic classification database operative to store mappings between traffic type names and traffic type identifiers;

classify a flow into a traffic type based on the at least one attribute of the flow; and wherein the flow data record emitter is further operative to:

transmit the mappings between the traffic type names and traffic type identifiers to the data collector.

21. The system of claim 19 wherein the at least one flow attribute is one of any of the following: a first packet time, a last packet time, the number of packets in the flow, the number of bytes in the flow, the number of retransmitted bytes in the flow, or a round trip time.

22. The system of claim 19 wherein the flow data record further includes one of any of the following: source address, destination address, source port number, destination port number, VLAN identifier, type of service identifier, a protocol family designation, a direction of packet flow designation, a protocol type designation, a protocol message designation, a first packet time, a last packet time, the number of packets in the flow, the number of bytes in the flow, the number of retransmitted bytes in the flow, or a round trip time.

23. The system of claim 19 wherein termination of a flow is determined based on a threshold period of time and the time of the last packet in the flow.

24. The system of claim 19 wherein termination of a flow is determined based on a protocol message.

25. The system of claim 24 wherein the protocol message is a TCP FIN packet.

26. A system enabling a flow-based data collection scheme, comprising at least one network device disposed in a communication path between first and second networks; the first network device comprising a packet processor operative to receive a flow, the flow comprising at least one packet;

associate a traffic type to the flow;

monitor the flow in relation to at least one flow attribute;

wherein, to associate the traffic type to the flow, the packet processor is further operative to parse at least one packet associated with the flow into a first flow specification, wherein said first flow specification contains at least one instance of any one of the following: a protocol family designation, a direction of packet flow designation, a protocol type designation, a pair of hosts, a pair of ports, a pointer to a multipurpose internet mail extensions (MIME) type, a pointer to an application-specific attribute;

match the first flow specification to a plurality of recognized traffic types represented by a plurality entries in at least one traffic type identification table, each entry in the traffic type identification table including at least one matching attribute; thereupon, having found a matching traffic type in the matching step, associate the first flow specification with a traffic type of said plurality of recognized traffic types in the at least one traffic identification table; and a flow data record emitter operative to:

upon termination of a flow, compose a flow data record comprising a traffic type identifier corresponding to the traffic type associated with the flow and the at least one monitored attribute; and transmit the flow data record to a data collector; and a data collector operative to:

receive flow data records from the first network device; and store the flow data records in a searchable database.

* * * * *